(12) United States Patent
Tamura

(10) Patent No.: US 8,577,178 B2
(45) Date of Patent: Nov. 5, 2013

(54) IMAGE PROCESSING DEVICE, IMAGE DISPLAY DEVICE, AND IMAGE DATA PRODUCING METHOD

(75) Inventor: Akihiko Tamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 937 days.

(21) Appl. No.: 12/506,641

(22) Filed: Jul. 21, 2009

(65) Prior Publication Data

US 2010/0021080 A1    Jan. 28, 2010

(30) Foreign Application Priority Data

Jul. 22, 2008 (JP) ................................ 2008-188891

(51) Int. Cl.
*G06K 9/32* (2006.01)
*G03B 21/134* (2006.01)
*G03B 21/10* (2006.01)

(52) U.S. Cl.
USPC ........... 382/295; 382/266; 382/267; 382/268; 382/269; 382/273; 382/274; 382/300; 353/46; 353/47; 353/48; 353/49; 353/51; 353/76; 353/77; 348/580; 348/581

(58) Field of Classification Search
CPC ......... G06K 9/32; G06T 5/001; G06T 3/4007
USPC ......... 382/266, 267, 268, 269, 273, 274, 295, 382/300; 353/46, 47, 48, 49, 50, 51, 76, 77; 348/580, 581
See application file for complete search history.

(56) References Cited

U.S. PATENT DOCUMENTS

| | | | |
|---|---|---|---|
| 6,367,933 B1 * | 4/2002 | Chen et al. ....................... | 353/69 |
| 7,362,385 B2 * | 4/2008 | Ohta et al. ..................... | 348/745 |
| 7,733,407 B2 * | 6/2010 | Furukawa ..................... | 348/335 |
| 7,941,001 B1 * | 5/2011 | Sahu et al. .................... | 382/298 |
| 2007/0188715 A1 * | 8/2007 | Inazumi ......................... | 353/30 |

FOREIGN PATENT DOCUMENTS

JP    A-2005-12561    1/2005

* cited by examiner

*Primary Examiner* — Matthew Bella
*Assistant Examiner* — Jose M Torres
(74) *Attorney, Agent, or Firm* — Oliff & Berridge, PLC

(57) ABSTRACT

An image processing device includes: a transformation ratio calculation unit which calculates transformation ratio of an image after transformation, the image after transformation being obtained by transforming an original image under predetermined rule; a filter coefficient calculation unit which calculates filter coefficients based on the transformation ratio; and a pixel value calculation unit which calculates the pixel value of each pixel in the image after transformation using the filter coefficients and outputs the pixel value of the image after transformation as image data after transformation.

9 Claims, 11 Drawing Sheets

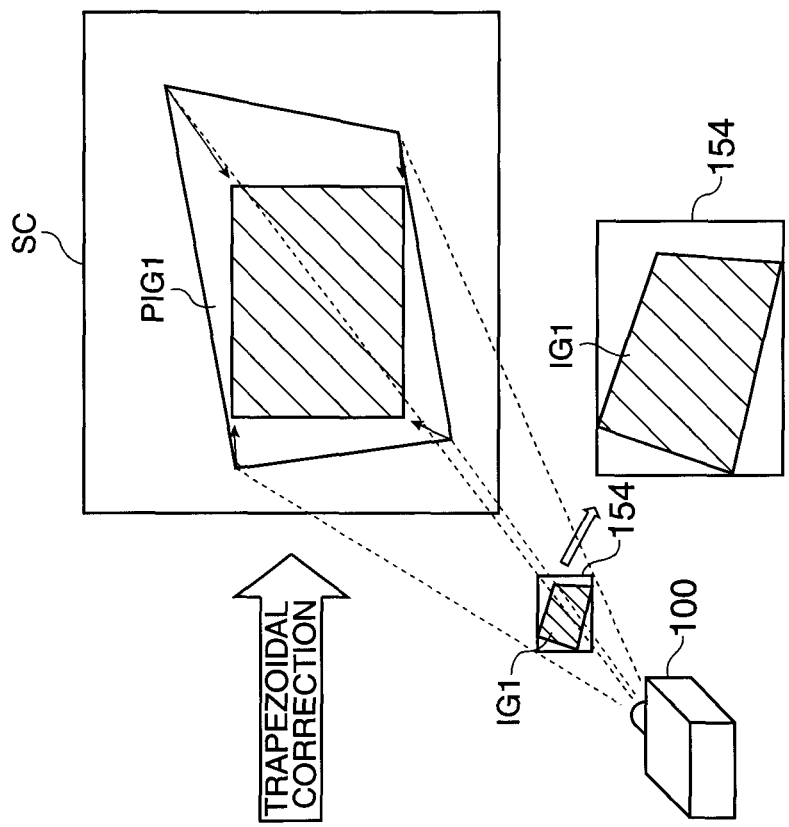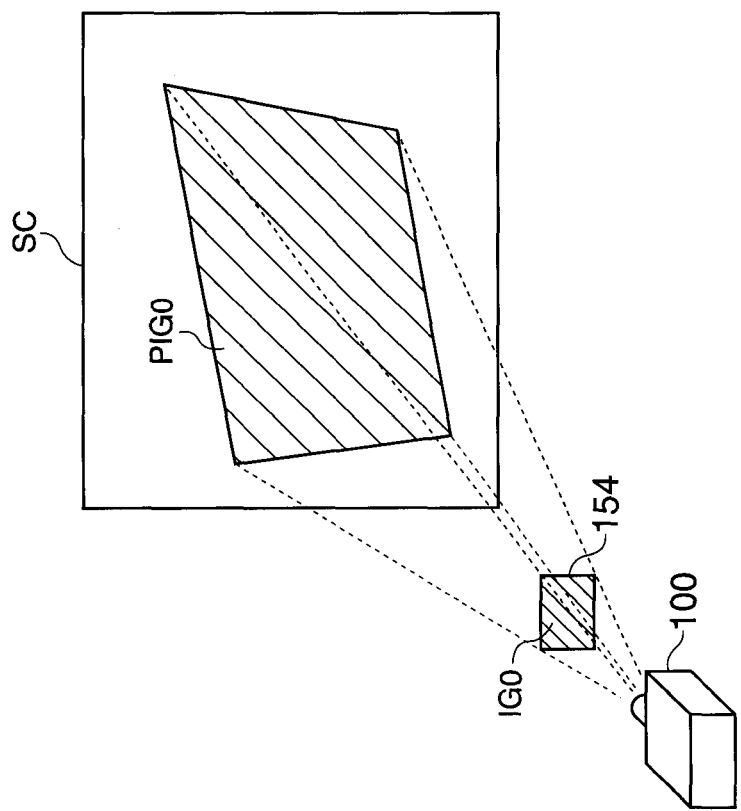
FIG. 1

IMAGE BEFORE CORRECTION

IMAGE AFTER CORRECTION

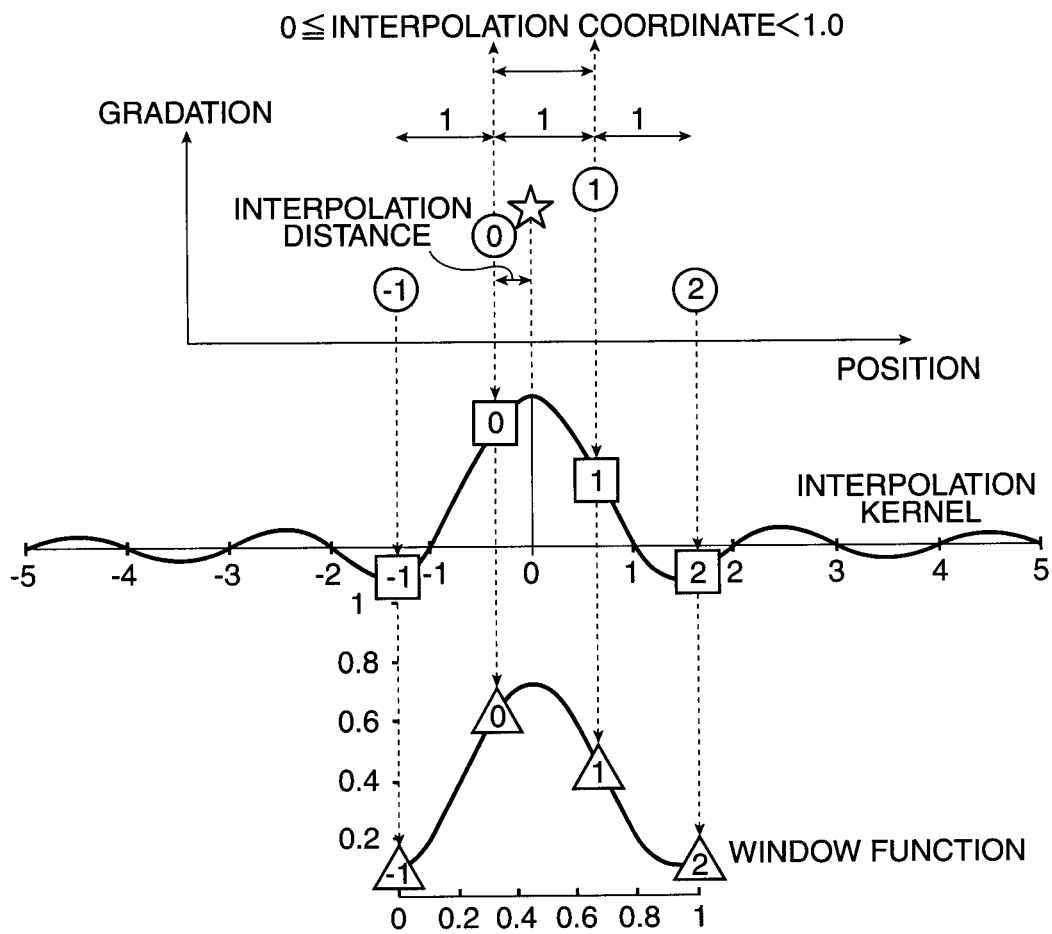
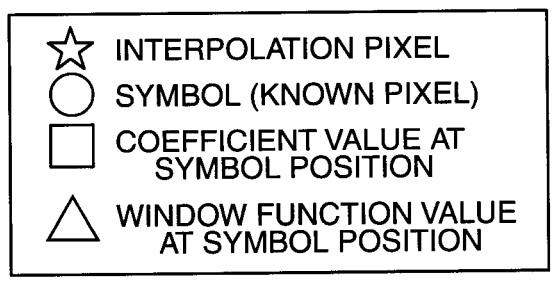
FIG. 9

FIG. 10A

TRANSFORMATION RATIO TABLE (T1)

| VERTICAL TRANSFORMATION RATIO | HORIZONTAL TRANSFORMATION RATIO | | | | |
|---|---|---|---|---|---|
| | 1 | 0.8 | 0.6 | 0.4 | 0.2 |
| 1 | S TABLE00 | S TABLE10 | S TABLE20 | S TABLE30 | S TABLE40 |
| 0.8 | S TABLE01 | S TABLE11 | S TABLE21 | S TABLE31 | S TABLE41 |
| 0.6 | S TABLE02 | S TABLE12 | S TABLE22 | S TABLE32 | S TABLE42 |
| 0.4 | S TABLE03 | S TABLE13 | S TABLE23 | S TABLE33 | S TABLE43 |
| 0.2 | S TABLE04 | S TABLE14 | S TABLE24 | S TABLE34 | S TABLE44 |

FIG. 10B

S TABLE00 (T2)

| VERTICAL INTERPOLATION DISTANCE | HORIZONTAL INTERPOLATION DISTANCE | | | | | | | |
|---|---|---|---|---|---|---|---|---|
| | 0 | 1/8 | 2/8 | 3/8 | 4/8 | 5/8 | 6/8 | 7/8 |
| 0 | I TABLE00 | I TABLE10 | I TABLE20 | I TABLE30 | I TABLE40 | I TABLE50 | I TABLE60 | I TABLE70 |
| 1/8 | I TABLE01 | I TABLE11 | I TABLE21 | I TABLE31 | I TABLE41 | I TABLE51 | I TABLE61 | I TABLE71 |
| 2/8 | I TABLE02 | I TABLE12 | I TABLE22 | I TABLE32 | I TABLE42 | I TABLE52 | I TABLE62 | I TABLE72 |
| 3/8 | I TABLE03 | I TABLE13 | I TABLE23 | I TABLE33 | I TABLE43 | I TABLE53 | I TABLE63 | I TABLE73 |
| 4/8 | I TABLE04 | I TABLE14 | I TABLE24 | I TABLE34 | I TABLE44 | I TABLE54 | I TABLE64 | I TABLE74 |
| 5/8 | I TABLE05 | I TABLE15 | I TABLE25 | I TABLE35 | I TABLE45 | I TABLE55 | I TABLE65 | I TABLE75 |
| 6/8 | I TABLE06 | I TABLE16 | I TABLE26 | I TABLE36 | I TABLE46 | I TABLE56 | I TABLE66 | I TABLE76 |
| 7/8 | I TABLE07 | I TABLE17 | I TABLE27 | I TABLE37 | I TABLE47 | I TABLE57 | I TABLE67 | I TABLE77 |

FIG. 10C

I TABLE00 (T3)

| VERTICAL SYMBOL POSITION | HORIZONTAL SYMBOL POSITION | | | |
|---|---|---|---|---|
| | -1 | 0 | 1 | 2 |
| -1 | E00 | E10 | E20 | E30 |
| 0 | E01 | E11 | E21 | E31 |
| 1 | E02 | E12 | E22 | E32 |
| 2 | E03 | E13 | E23 | E33 |

IMAGE PROCESSING DEVICE, IMAGE DISPLAY DEVICE, AND IMAGE DATA PRODUCING METHOD

This application claims priority to Japanese Patent Application No. 2008-188891, which was filed in Japan on Jul. 22, 2008, the entire disclosure of which is hereby incorporated by reference in its entirety.

BACKGROUND

1. Technical Field

The present invention relates to an image processing device for producing image data which represents an image to be displayed on an image display unit such as a liquid crystal panel.

2. Related Art

In displaying a rectangular image (hereinafter referred to as original image as well) on a projection surface such as screen by using a projector, there is a possibility that the image projected on the projection surface (hereinafter referred to as projection image as well) is distorted into a trapezoidal shape due to positional relationship between the projector and the projection surface. For correcting this distortion, keystone correction which corrects distortion of a projection image (hereinafter referred to as trapezoidal distortion as well) is employed.

The keystone correction produces an image distorted in the direction opposite to the distortion direction of the projection image on the projection surface to form a transformed image (hereinafter referred to as image after transformation as well) on the liquid crystal panel. According to this method, a rectangular image is transformed into a quadrangular image such as trapezoid and parallelogram and displayed on the liquid crystal panel. Thus, the transformation ratio of the image after transformation on the liquid crystal panel to the original image differs according to the positions on the image after transformation.

Pixel values of the image after transformation are calculated by pixel interpolation based on pixel values of the original image. In calculating the pixel values of the image after transformation according to related art, interpolation is performed using the same filter coefficient for the entire image. In this case, image quality decreases at the portion having high transformation ratio. For overcoming this problem, such a technology has been proposed which changes the filter coefficient according to the projection angle to the projection surface of the projector and the coordinate position on the liquid crystal panel.

According to an image processing device disclosed in JP-A-2005-12561, the filter coefficient is varied according to the projection angle to the projection surface of the projector and the coordinate position on the liquid crystal panel. In this case, a table of filter coefficients for respective projection angles to the projection surface of the projector needs to be prepared, for example. That is, the filter coefficient is calculated based on the two parameters of the projection angle to the projection surface of the projector and the coordinate position on the liquid crystal panel. Thus, algorithms for the calculation become complicated.

These problems arise not only from the case of projector but also from other image processing devices which can transform images.

SUMMARY

It is an advantage of some aspects of the invention to provide a technology for improving image quality of an image after transformation when the image is transformed.

At least a part of this advantage is provided by the following examples of the invention.

An image processing device according to an aspect of the invention includes: a transformation ratio calculation unit which calculates transformation ratio of an image after transformation obtained by transforming an original image under predetermined rule to the original image for each pixel; a filter coefficient calculation unit which calculates filter coefficient based on the transformation ratio corresponding to each pixel to use the filter coefficient for calculation of a pixel value of the image after transformation by pixel interpolation using a pixel value of the original image; and a pixel value calculation unit which calculates the pixel value of the image after transformation using the filter coefficient corresponding to each pixel and outputs the pixel value of the image after transformation as image data after transformation.

According to the image processing device of this aspect of the invention, the transformation ratio of the image after transformation to the original image is calculated for each pixel of the image after transformation, and the filter coefficient is calculated based on the transformation ratio. Since the pixel value is calculated for each pixel using appropriate filter coefficient, the image quality improves. Also, since the filter coefficient is calculated based on one parameter of transformation ratio, algorithms used can be simplified.

It is preferable that the transformation ratio calculation unit calculates the transformation ratio for each pixel of the image after transformation.

According to this structure, the transformation ratio is calculated for each pixel of the image after transformation. Thus, pixel value for each pixel can be calculated using more appropriate filter coefficient.

It is preferable that the image processing device outputs image data representing an image produced by applying trapezoidal distortion correction to the original image as the image data after transformation.

According to this structure, the image quality can be increased when displaying the image produced by applying trapezoidal distortion correction to the original image.

The invention is practiced not only as the image processing device described above, but as various applications such as image display device including the above image processing device, image data producing method, computer program for providing the above image processing device, and storage medium storing this computer program.

BRIEF DESCRIPTION OF THE DRAWINGS

The invention will be described with reference to the accompanying drawings, wherein like numbers reference like elements.

FIG. 1 illustrates a concept of trapezoidal distortion correction;

FIG. 9 illustrates a concept of pixel interpolation method;

FIGS. 10A through 10C show tables used for calculating filter coefficient;

DETAILED DESCRIPTION OF EMBODIMENTS

Exemplary embodiments according to the invention are hereinafter described in the following order:
A. First Embodiment
A-1. Trapezoidal Distortion Correction
A-2. Structure of Projector
A-3. Trapezoidal Distortion Correction Unit
A-4. Image Data after Correction Production Process
A-4-1. Transformation Ratio Calculation Process
A-4-2. Filter Coefficient Calculation Process
A-4-3. Pixel Interpolation Method
A-5. Advantage of First Embodiment
B. Second Embodiment
C. Modified Examples
A. First Embodiment
A-1. Trapezoidal Distortion Correction A projector 100 according to a first embodiment of the invention projects image light representing an image to display the image on a screen such as screen SC. The projector 100 is a projector capable of correcting trapezoidal distortion of the image displayed on the screen SC and displaying a rectangular image thereon when receiving a rectangular image. Before touching upon the structure of the projector 100, trapezoidal distortion correction performed by the projector 100 in this embodiment is briefly discussed.

FIG. 1 illustrates a concept of the trapezoidal distortion correction. When the projector 100 is disposed inclined to the screen SC in the horizontal direction (left-right direction) and the vertical direction (up-down direction) as illustrated in the figure, an image displayed on a liquid crystal panel 154 (image before correction IG0) as a rectangular image becomes a trapezoidal image PIG0 projected on the screen as an image distorted in the horizontal direction and vertical direction. In FIG. 1, the liquid crystal panel 154 included in the projector 100 is shown outside the projector 100 for easy understanding of the explanation.

When an image distorted in the direction opposite to the distortion direction of the image projected on the screen SC (image after correction IG1) is formed on the liquid crystal panel 154, a rectangular image PIG1 is displayed on the screen SC. This correction for producing a rectangular image (image having the shape desired to be displayed on the screen) from the image having trapezoidal distortion is referred to as trapezoidal distortion correction. The image before correction IG0 in this embodiment corresponds to an original image in the appended claims, and the image after correction IG1 in this embodiment corresponds to an image after transformation in the appended claims. The trapezoidal distortion correction process in this embodiment corresponds to a process for transforming an image under predetermined rule in the appended claims.

Figure 2A:
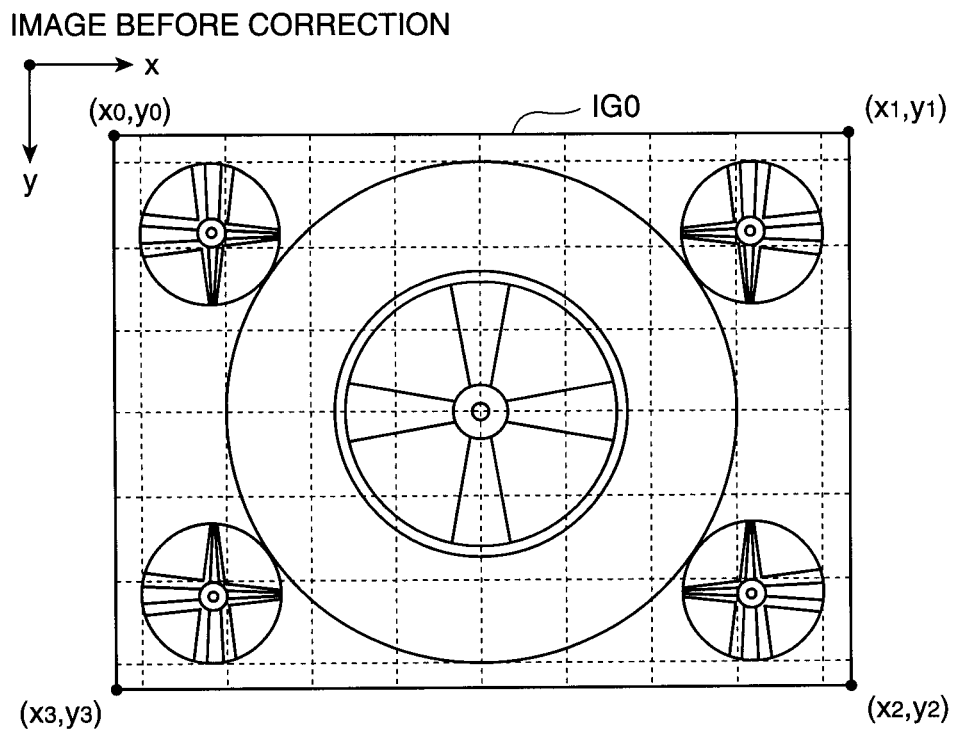
FIGS. 2A and 2B illustrate images displayed on a liquid crystal panel 154 before and after correction.
Figure 2B:
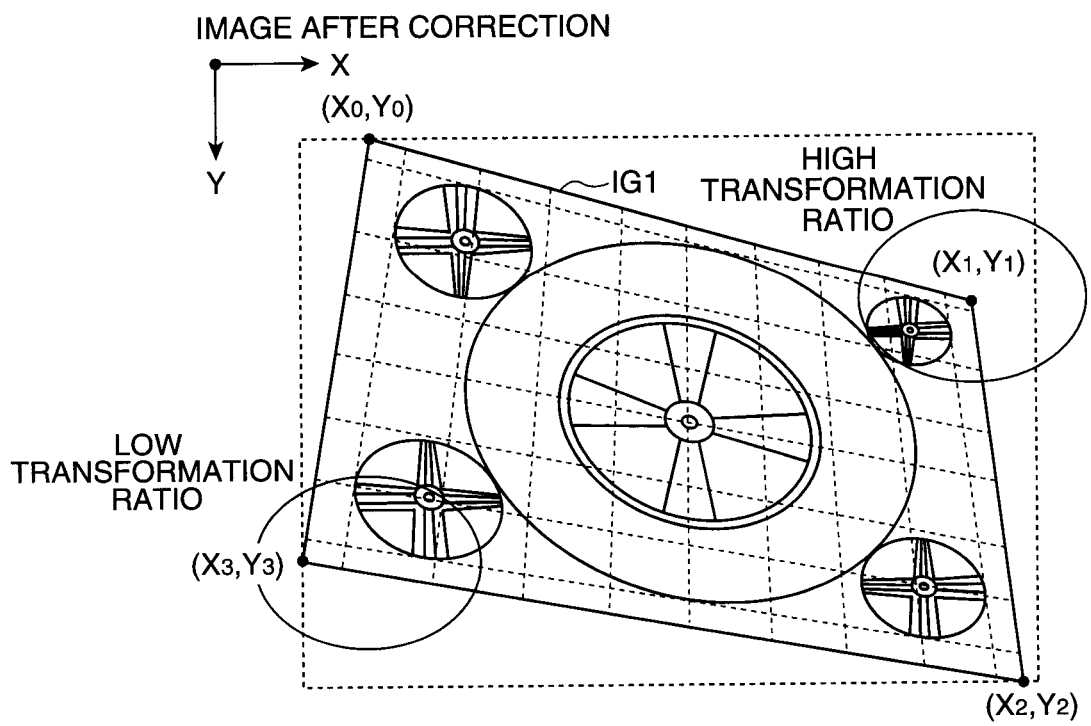

FIGS. 2A and 2B illustrate images displayed on the liquid crystal panel 154 before and after the correction. FIG. 2A shows the image before correction IG0, and FIG. 2B shows the image after correction IG1. A broken line in FIG. 2B represents the external shape of the image before correction IG0. Since the image before correction IG0 is processed in such a manner as to be displayed throughout the frame of the liquid crystal panel 154, the broken line in FIG. 2B corresponds to the frame of the liquid crystal panel 154.

As illustrated in FIG. 2B, the reduction ratio of the image after correction IG1 to the image before correction IG0 is higher (that is, the transformation ratio is larger) in the vicinity of a vertex (X1, Y1), and is lower (that is, transformation ratio is smaller) in the vicinity of a vertex (X3, Y3). Thus, the image after correction IG1 has different transformation ratios according to the coordinates on the image after correction IG1. The coordinates on the image after correction IG1 are pixel coordinates on the image after correction IG1 displayed on the liquid crystal panel 154.

As explained, the image after correction IG1 has different transformation ratios according to the coordinates on the image after correction IG1. Thus, the projector 100 in this embodiment calculates transformation ratio of the image after correction IG1 to the image before correction IG0 for each of the pixel coordinates on the liquid crystal panel 154 and calculates pixel value of the image after correction IG1 based on the calculated transformation ratios to produce image data after correction representing the image after correction IG1 (details will be described later). The pixel coordinates on the liquid crystal panel 154 on which the image after correction IG1 is displayed are referred to as coordinates after correction. The pixel coordinates in the area of the liquid crystal panel 154 not displaying the image after correction IG1 are referred to as coordinates after correction as well. The coordinates after correction are converted into the coordinate positions on the image before correction IG0 (pixel coordinates on liquid crystal panel) as coordinates before correction by inverse perspective transformation.

A-2. Structure of Projector

Figure 3:
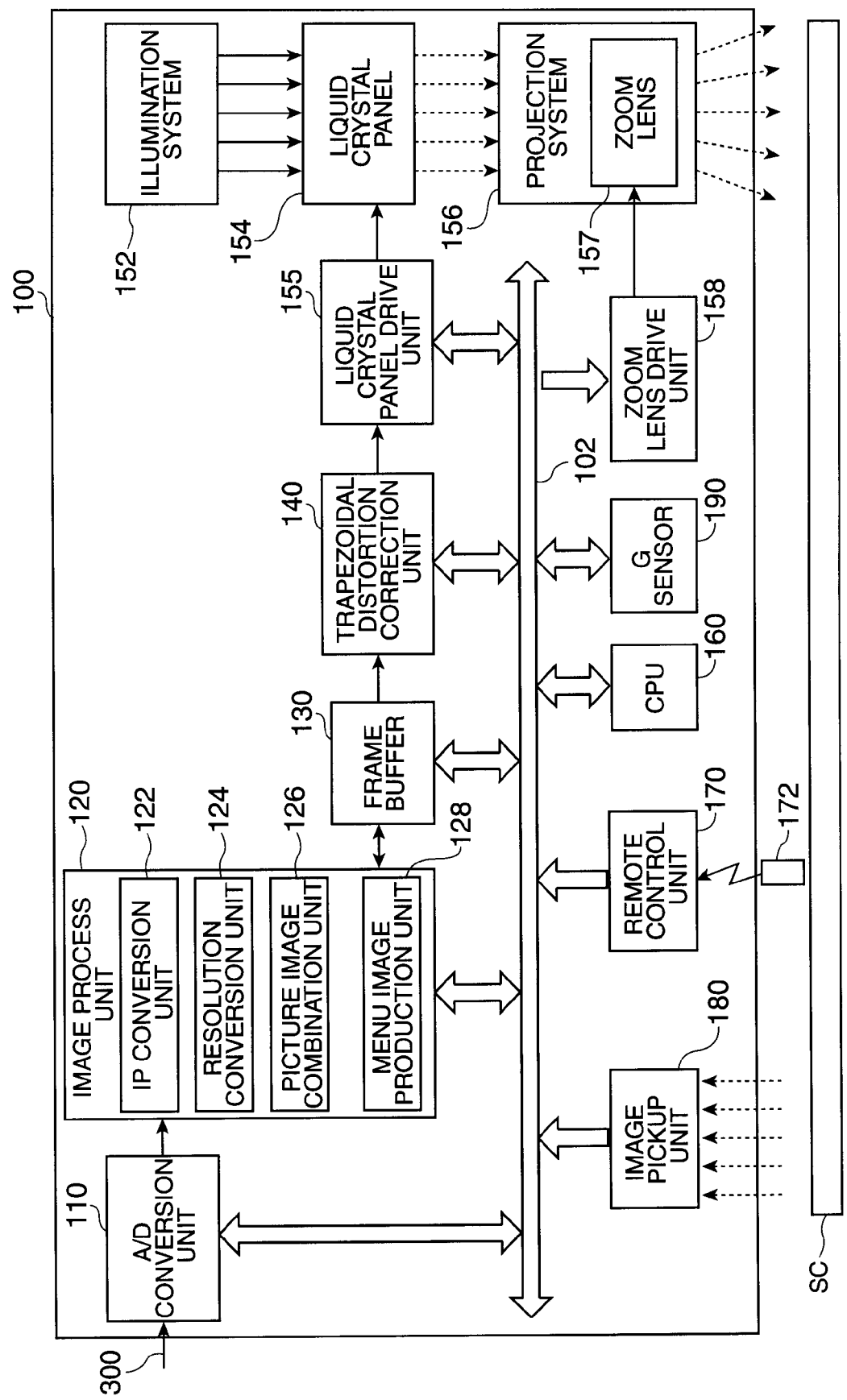
FIG. 3 is a block diagram showing a general structure of a projector according to a first embodiment of the invention.

FIG. 3 is a block diagram showing the general structure of the projector according to the first embodiment of the invention. As shown in the figure, the projector 100 includes an A/D conversion unit 110, an image process unit 120, a frame buffer 130, a trapezoidal distortion correction unit 140, the liquid crystal panel 154, a liquid crystal panel drive unit 155, an illumination system 152, a projection system 156 having a zoom lens 157, a zoom lens drive unit 158, a CPU 160, a remote control unit 170, a remote controller 172, an image pickup unit 180, and a G sensor 190. The A/D conversion unit 110, the image process unit 120, the frame buffer 130, the trapezoidal distortion correction unit 140, the liquid crystal panel drive unit 155, the zoom lens drive unit 158, and CPU 160, the remote control unit 170, and the G sensor 190 are connected with one another via a bus 102.

The A/D conversion unit 110 applies A/D conversion to input image signals received via a cable 300 from not-shown DVD player, personal computer or the like as necessary to output digital image signals. The image process unit 120 writes the digital image signals outputted from the A/D conversion unit 110 to the frame buffer 130 for each frame. The image process unit 120 provides functions of an IP conversion unit 122, a resolution conversion unit 124, a picture image combination unit 126, and a menu image production unit 128.

The IP conversion unit 122 converts interlace system of the format for image data stored in the frame buffer 130 into progressive system, and supplies the converted image data to the resolution conversion unit 124.

The resolution conversion unit 124 expands or reduces the size of the image data supplied from the IP conversion unit 122 (that is, resolution conversion process), and supplies the converted image data to the picture image combination unit 126.

The menu image production unit 128 produces characters and symbols representing the operation condition of the projector 100 and images used for image quality adjustment, and supplies the produced images and the like to the picture image combination unit 126.

The picture image combination unit 126 combines the menu images produced by the menu image production unit 128 and the image data supplied from the resolution conversion unit 124, and writes the combined data to the frame buffer 130 as image data before correction. In this embodiment, the image represented by the image data before correction (image before correction) corresponds to the original image in the appended claims.

The trapezoidal distortion correction unit 140 corrects distortion caused when the projector 100 projects images with its projection axis inclined to the screen SC (hereinafter referred to as trapezoidal distortion). More specifically, the trapezoidal distortion correction unit 140 performs correction process for the image data before correction and supplies the corrected data to the liquid crystal panel drive unit 155 as image data after correction such that the liquid crystal panel 154 can display the image before correction represented by the image data before correction stored in the frame buffer 130 in the form of compensation for the trapezoidal distortion. The details of the trapezoidal correction unit 140 will be described later. The trapezoidal distortion correction unit 140 in this embodiment corresponds to an image processing device in the appended claims.

The liquid crystal panel drive unit 155 drives the liquid crystal panel 154 according to the digital image signals inputted via the trapezoidal distortion correction unit 140. The liquid crystal panel 154 is constituted by a transmission type liquid crystal panel which contains a plurality of pixels disposed in matrix. The liquid crystal panel 154 is driven by the liquid crystal panel drive unit 155, and varies light transmittance of each pixel disposed in matrix to form an image for modulating illumination light supplied from the illumination system 152 into effective image light representing the image to be displayed. In this embodiment, the liquid crystal panel 154 has XGA mode, and resolution of 1,024×768 dots. According to this embodiment, the liquid crystal panel pixel coordinates are defined as x=0 through 1,023 and y=0 through 767. The liquid crystal panel drive unit 155 and the liquid crystal panel 154 in this embodiment correspond to a modulation unit in the appended claims.

The illumination system 152 has a lamp such as high-pressure mercury lamp and extra-high pressure mercury lamp or other light emission body. The illumination system 152 in this embodiment corresponds to a light source in the appended claims.

The projection system 156 is attached to the front surface of the housing of the projector 100 to expand and project the image light modulated by the liquid crystal panel 154. The zoom lens drive unit 158 drives the zoom lens 157 provided on the projection system 156 to vary zoom condition. The zoom condition herein refers to the degree of expansion (magnification) for projection of light transmitted by the liquid crystal panel 154. Thus, the zoom lens drive unit 158 can change the size of the image PIG1 (FIG. 1) displayed on the screen SC by driving the zoom lens 157. The projection system 156 in this embodiment corresponds to a projection system in the appended claims.

The remote control unit 170 receives commands from the user through the remote controller 172, and transmits these commands to the CPU 160 via the bus 102. While the projector 100 receives the commands from the user through the remote controller 172 and the remote control unit 170 in this embodiment, the projector 100 may receive the commands through other structure such as operation panel.

The CPU 160 reads and performs control programs stored in a memory unit (not shown) to control operations of components disposed within the projector 100. The CPU 160 also calculates coordinates after correction (X0 through X3, Y0 through Y3) which will be described later (see FIGS. 2A and 2B), transformation coefficients of coordinate transformation matrix (which will be described later in detail) based on images shot by the image pickup unit 180, inclination of the projector 100 detected by the G sensor 190, and commands from the user inputted trough the remote control unit 170, and outputs the calculated data to the trapezoidal distortion correction unit 140.

The image pickup unit 180 has a CCD camera, and produces pickup images. The pickup images produced by the image pickup unit 180 are stored in a not-shown pickup image memory. Other image pickup device may be provided on the image pickup unit 180 in place of the CCD camera.

The G sensor 190 can detect inclination angle formed by the CCD optical axis of the image pickup unit 180 and the horizontal surface by detecting inclination of the projector 100 to the vertical direction.

A-3. Trapezoidal Distortion Correction Unit

Figure 4:
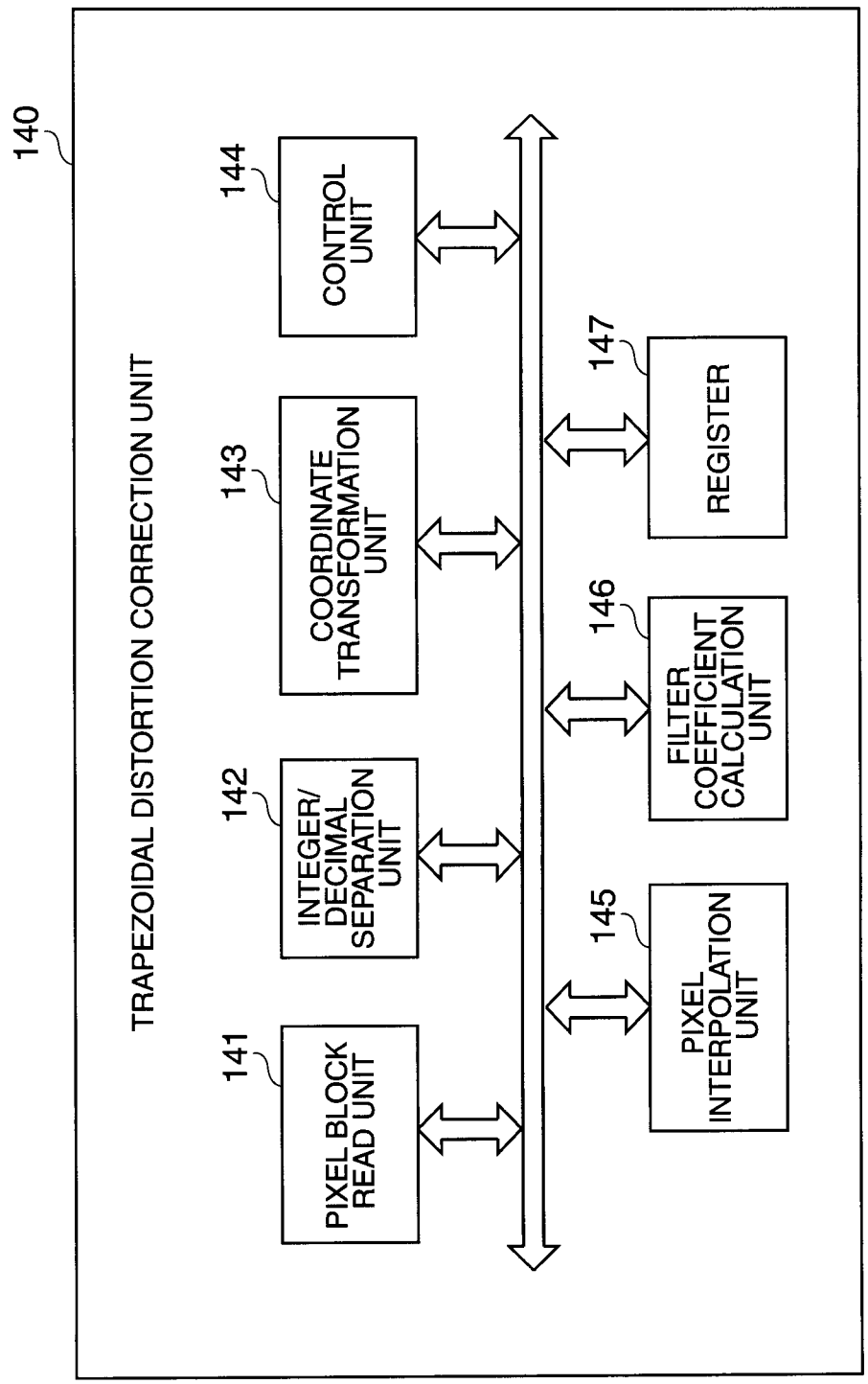
FIG. 4 is a block diagram showing a structure of a trapezoidal distortion correction unit 140.

FIG. 4 is a block diagram showing the function of the trapezoidal distortion correction unit 140. As shown in FIG. 4, the trapezoidal distortion correction unit 140 includes a pixel block read unit 141, an integer/decimal separation unit 142, a coordinate transformation unit 143, a control unit 144, a pixel interpolation unit 145, a filter coefficient calculation unit 146, and a register 147.

The pixel block read unit 141 obtains and stores image data before correction stored in the frame buffer 130 (FIG. 3) for each block constituted by 8×8 pixels. The pixel block read unit 141 also supplies interpolation pixel block constituted by 4×4 pixels and specified by integer component of the coordinates before correction received from the integer/decimal separation unit 142 to the pixel interpolation unit 145. The coordinates before correction refer to coordinate values obtained by transforming the coordinates of the image after correction (pixel coordinates) as the image before correction to which the trapezoidal distortion correction has been applied into the coordinates of the image before correction as will be described later.

The control unit 144 controls the respective components of the trapezoidal distortion correction unit 140 under the programs stored in the not-shown memory unit to perform the trapezoidal distortion correction.

The register 147 stores parameters supplied from the CPU 160 (FIG. 3). More specifically, the register 147 stores commands associated with the trapezoidal distortion correction, information about status of process, information about input images (such as image resolution), storage addresses of images before correction (storage addresses of frame buffer 130), and information about coordinates before correction (x0 through x3, y0 through y3) (see FIGS. 2A and 2B), coordinates after correction (X0 through X3, Y0 through Y3) (see FIGS. 2A and 2B), transformation coefficients of coordinate transformation matrix (details will be described later), and background colors (such as blue).

The coordinate transformation unit 143 transforms the coordinate values of the image after correction IG1 to which trapezoidal distortion correction has been applied (hereinafter referred to as "coordinates after correction" as well) into coordinate values of the image before correction IG0 (rectangular image) (hereinafter referred to as "coordinates before correction" as well). Then, the coordinate transformation unit 143 calculates transformation ratio of the image after correction IG1 to the image before correction IG0 for each of the coordinates on the image after correction IG1 and outputs the calculated ratios to the filter coefficient calculation unit 146. The calculation method of the transformation ratios will be described later.

The coordinate transformation unit 143 also outputs the calculated coordinates before correction to the integer/decimal separation unit 142. Since the image before correction IG0 and the image after correction IG1 do not have integer number multiplication correspondence, the coordinate values outputted from the coordinate transformation unit 143 contain decimals. The coordinate transformation unit 143 in this embodiment corresponds to a transformation ratio calculation unit in the appended claims.

The integer/decimal separation unit 142 separates integers from decimals contained in the coordinate values outputted from the coordinate transformation unit 143. Then, the integer/decimal separation unit 142 supplies integers to the pixel block read unit 141, and supplies decimals to the pixel interpolation unit 145. The pixel block read unit 141 reads the interpolation pixel blocks corresponding to the integers of the coordinate values supplied from the integer/decimal separation unit 142, and supplies the interpolation pixel blocks to the pixel interpolation unit 145.

The filter coefficient calculation unit 146 calculates filter coefficients used for pixel interpolation based on the transformation ratios supplied from the coordinate transformation unit 143 and the decimals outputted from the integer/decimal separation unit 142. The calculation method of the filter coefficients will be described later. The filter coefficient calculation unit 146 in this embodiment corresponds to a filter coefficient calculation unit in the appended claims.

The pixel interpolation unit 145 performs pixel interpolation based on the interpolation pixel blocks supplied from the pixel block read unit 141 and the filter coefficients supplied from the filter coefficient calculation unit 146. Then, the pixel interpolation unit 145 calculates values of interpolation pixels (pixels of image after correction) and outputs the calculated values of the interpolation pixels to the liquid crystal panel drive unit 155 (FIG. 3). The pixel interpolation unit 145 in this embodiment corresponds to a pixel value calculation unit in the appended claims.

A-4. Image Data After Correction Production Process

Figure 5:
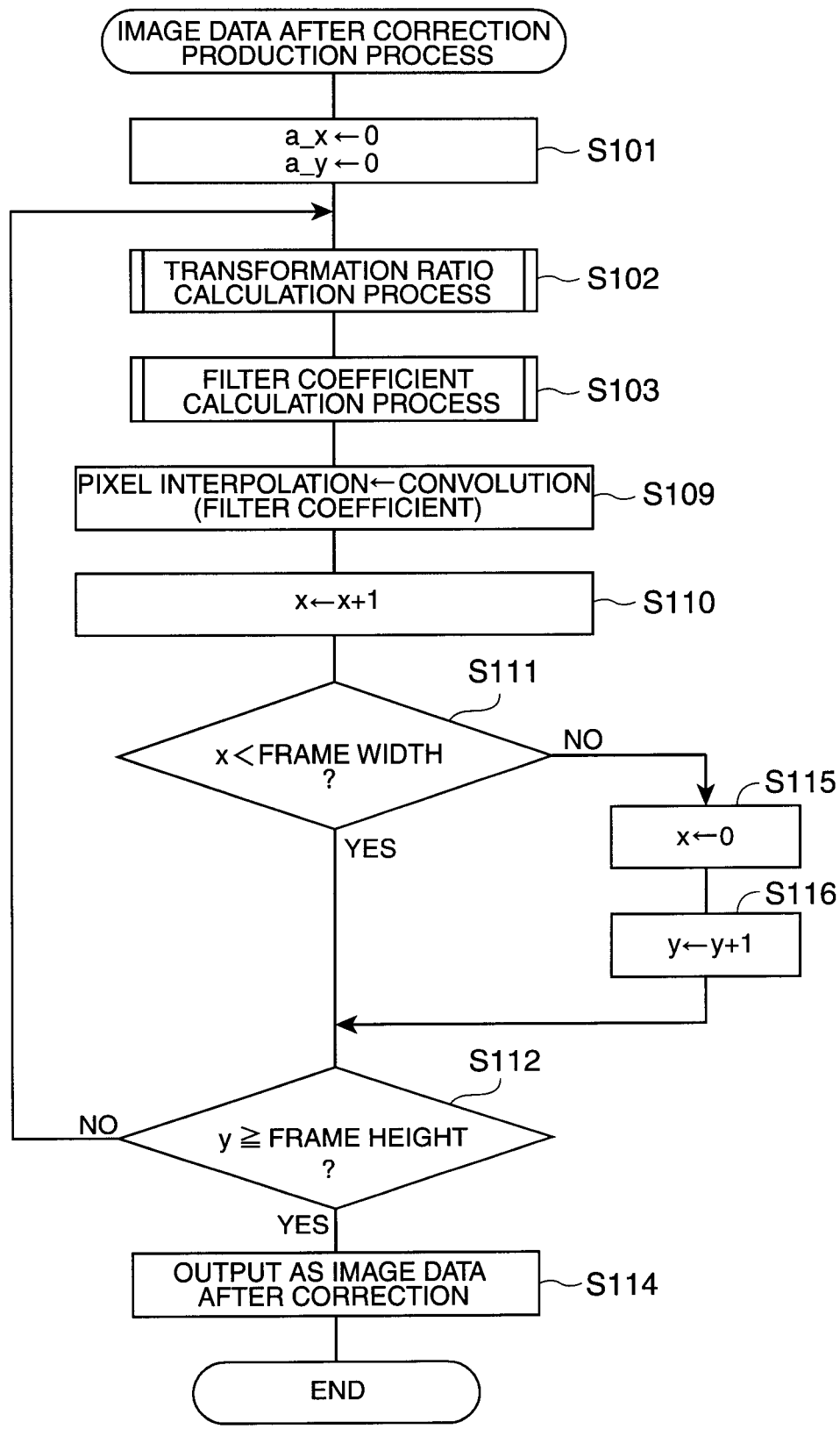
FIG. 5 is a flowchart showing flow of image data after correction production process performed by a projector 100.

FIG. 5 is a flowchart showing flow of image data after correction production process performed by the projector 100 in this embodiment. Initially, the control unit 144 defines coordinates after correction as (a_x, a_y)=(0, 0) (step S101).

In this embodiment, the "coordinates" refer to pixel coordinates on the liquid crystal panel 154 as discussed above. As shown in FIGS. 2A and 2B, the origin of the pixel coordinates are located at the upper left corner, and plus values are shown on the right part in the x direction and lower part in the y direction.

Then, the coordinate transformation unit 143 performs transformation ratio calculation process for calculating the transformation ratio of the image after correction to the image before correction (hereinafter abbreviated as "transformation ratio" as well) for the coordinates after correction (0, 0) (step S102). The filter coefficient calculation unit 146 performs filter coefficient calculation process for calculating the filter coefficient used for obtaining the pixel value of the coordinates after correction (0, 0) (step S103). The pixel interpolation unit 145 calculates the pixel value of the coordinates after correction (0, 0) using the filter coefficient calculated in step S103 (step S109).

The control unit 144 increments a parameter x by "1" (step S110). Since the parameter x is currently "0", it becomes x=0+1="1". Then, the control unit 144 judges whether the value of the parameter x is larger than the frame width (1,023 in this embodiment) or not (step S111), and goes to step S112 when it has judged that the parameter x is smaller (YES in step S111).

Then, the control unit 144 judges whether a parameter y is larger than the frame height (767 in this embodiment) or not. Since the parameter y is currently "0", the control unit 144 judges that the parameter y is smaller than the frame height and returns to step S102 (NO in step S112). The coordinate transformation unit 143 performs transformation ratio calculation process similar to the step described above (step S102) for the coordinates after correction (1, 0). The filter coefficient calculation unit 146 performs the filter coefficient calculation process (step S103). The pixel interpolation unit 145 performs the pixel interpolation process (step S109). By these processes, the pixel value of the coordinates after correction (1, 0) is obtained.

After these processes are repeated for the parameter y=0 and the parameters x=0 through 1,023, the control unit 144 judges that the parameter x is equal to or larger than the frame width in step S111. Then, the control unit 144 sets the parameter x at 0 (step S115) and increments the parameter y by "1" (step S116). As a result, the parameter y becomes "1". When the control unit 144 goes to step S112 and judges that the parameter y is smaller than the frame height, the control unit 144 returns to step S102 and repeats the same processes described above. After calculation of pixel values for the coordinates after transformation (0, 0) through (1,023, 767) is completed, the control unit 144 judges that the parameter y is equal to or larger than the frame height (YES in step S112). Then, the pixel interpolation unit 145 outputs the calculated pixel values of the image after correction to the liquid crystal panel drive unit 155 as image data after correction (step S114), and the process ends.

For calculating pixel values of the image after correction in this embodiment, coordinates before correction (real numbers) corresponding to coordinates after correction are sequentially calculated for each of the coordinates after correction (0, 0) to (1,023, 767) to calculate transformation ratios of the image after correction to the image before correction. Then, filter coefficients are calculated based on the transformation ratios, and pixel interpolation is performed using the calculated filter coefficients to calculate pixel values of the coordinates before correction. Thus, a set of processes including calculation of transformation ratios, calculation of filter coefficients, and pixel interpolation are repeated for each of all the coordinates after correction. When the pixel interpolation unit 145 (FIG. 4) calculates all pixel values of the coordinates after correction (0, 0) through (1,023, 767) and outputs the calculated pixel values to the liquid crystal panel drive unit 155 (FIG. 3) as image data after correction, the image after correction IG1 is formed on the liquid crystal panel 154 (FIG. 3).

In case of successive input of plural images, pixel interpolation may be performed by repeating the above processes for each image. Alternatively, filter coefficients may be calculated for each of the coordinates as discussed above to store the calculated filter coefficients in the register 147. In this case, pixel interpolation is performed using the filter coefficients stored in the register 147 at the time of trapezoidal distortion correction for the second and subsequent images.

A-4-1. Transformation Ratio Calculation Process

The coordinate transformation unit 143, in transformation ratio calculation process S102, transforms target coordinates whose pixel value is calculated and eight coordinates around the target coordinates into the coordinates of the image before correction by inverse perspective transformation for each of the coordinates on the image after correction to calculate transformation ratio of the target coordinates.

Figure 6A:
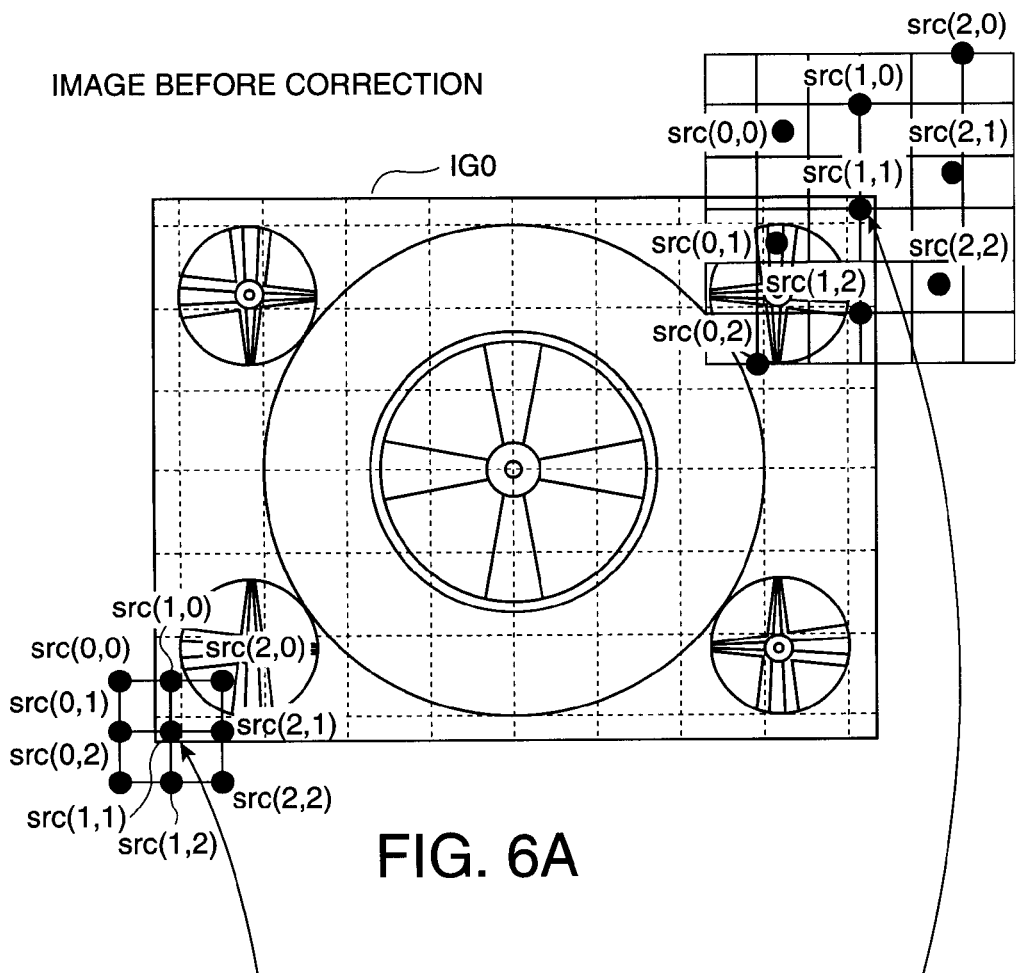
FIGS. 6A and 6B illustrate coordinate change of images before and after correction.
Figure 6B:
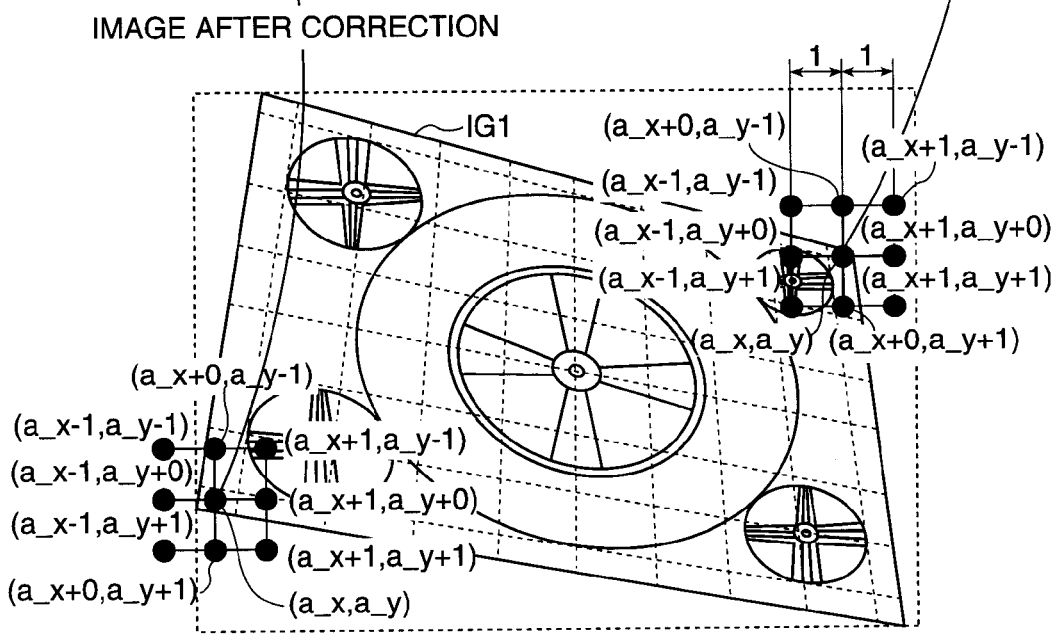

FIGS. 6A and 6B illustrate change of coordinates between images before and after correction. FIG. 6A shows the image before correction IG0, and FIG. 6B shows the image after correction IG1. FIG. 6A shows the coordinates before correction produced by transforming certain coordinates (a_x, a_y) on the image after correction IG1 shown in FIG. 6B and eight coordinates around these coordinates into the coordinates on the image before correction IG0.

Figure 7:
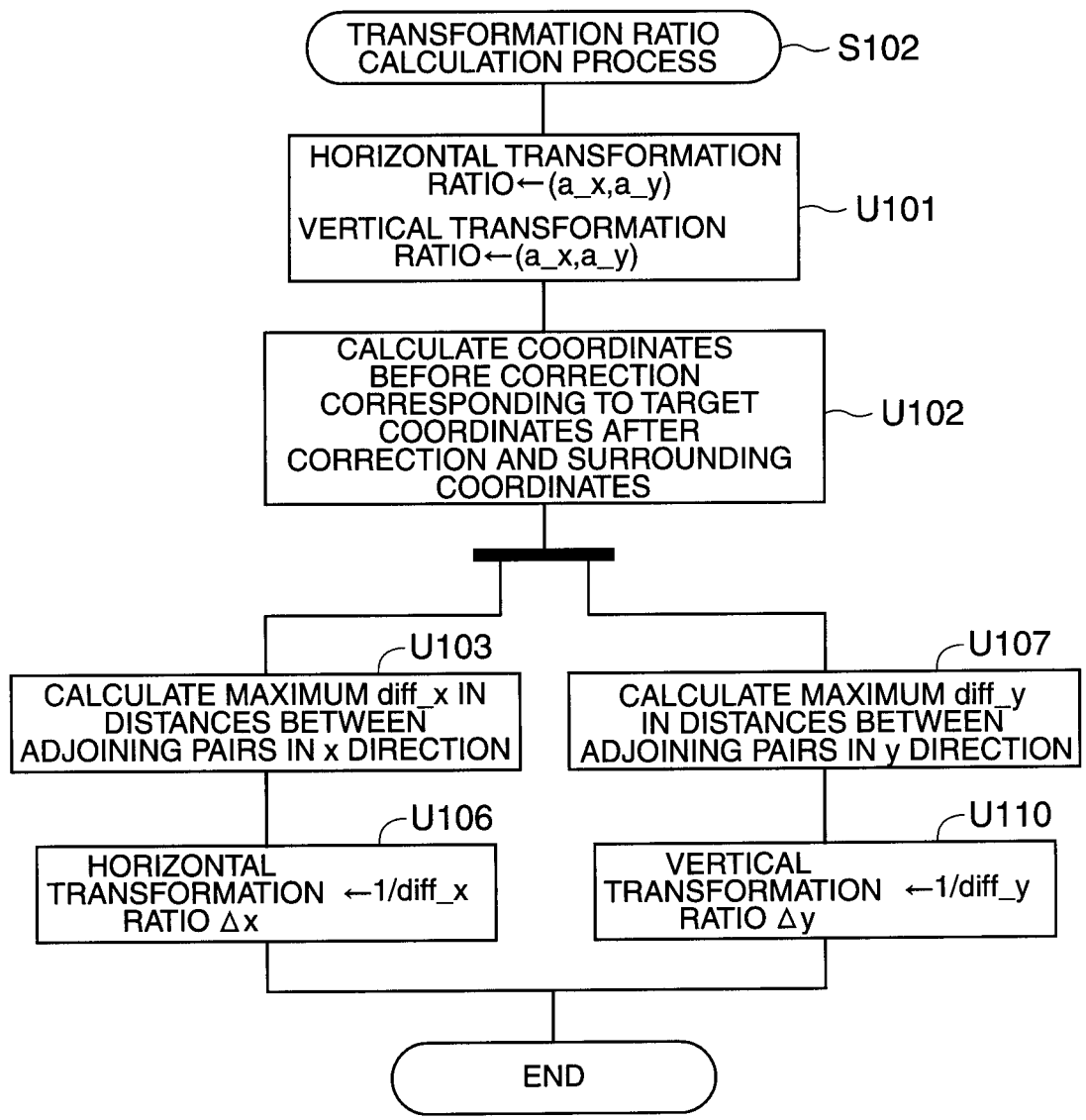
FIG. 7 is a flowchart showing flow of transformation ratio calculation process.

The transformation ratio calculation process S102 for calculating transformation ratio at the coordinates after correction (a_x, a_y) as target coordinates whose pixel value is calculated is now discussed with reference to FIG. 7. FIG. 7 is a flowchart showing flow of the transformation ratio calculation process.

Initially, the coordinate transformation unit 143 (FIG. 4) determines the coordinates (a_x, a_y) whose pixel value is calculated as target coordinates whose transformation ratio is calculated (hereinafter referred to as "target coordinates after correction" as well) on the image after correction IG1 (step U101). Then, the coordinate transformation unit 143 calculates coordinates before correction corresponding to the target coordinates after correction (a_x, a_y) and the surrounding eight coordinates (step U102).

In this embodiment, the target coordinates after correction of the image after correction IG1 are (a_x, a_y) as shown in FIG. 6B, and the surrounding pixel coordinates are coordinates of eight pixels around the target coordinates after correction as (a_x−1, a_y−1), (a_x+0, a_y−1), (a_x+1, a_y−1), (a_x−1, a_y+0), (a_x+1, a_y+0), (a_x−1 ,a_y+1), a_x+0, a_y+1, (a_x+1, a_y+1). The coordinates before correction are calculated by inverse perspective transformation as inversion of perspective transformation which will be described later.

The coordinates before correction calculated by the inverse perspective transformation are src (0, 0), src (1, 0), src (2, 0), src (0, 1), src (1, 1), src (2, 1), src (0, 2), src (1, 2), and src (2, 2) shown in FIG. 6A. Thus, coordinates after correction (a_x−1, a_y−1) becomes coordinates before correction src (0, 0), coordinates after correction (a_x+0, a_y−1) becomes coordinates before correction src (1, 0), coordinates after correction (a_x+1, a_y−1) becomes coordinates before correction src (2, 0), coordinates after correction (a_x−1, a_y+0) becomes coordinates before correction src (0, 1), coordinates after correction (a_x, a_y) becomes coordinates before correction src (1, 1), coordinates after correction (a_x+1, a_y+0) becomes coordinates before correction src (2, 1), coordinates after correction (a_x−1, a_y+1) becomes coordinates before correction src (0, 2), coordinates after correction (a_x+0, a_y+1) becomes coordinates before correction src (1, 2), coordinates after correction (a_x+1, a_y+1) becomes coordinates before correction src (2, 2).

Subsequently, the coordinate transformation unit 143 (FIG. 4) calculates the horizontal distance between each adjoining pair of the coordinates before correction to obtain the maximum value diff_x (step U103). More specifically, the horizontal distance between src (0, 0) and src (1, 0), the horizontal distance between src (1, 0) and src (2, 0), until the horizontal distance between src (1, 2) and src (2, 2) are calculated to obtain the maximum value diff_x in these distances. Since the horizontal distance between the adjoining coordinates after correction is "1" as shown in FIG. 6B, the coordinate transformation unit 143 sets a horizontal transformation ratio Δx at 1/diff_x (step U106). According to this embodiment, the transformation ratio is calculated based on the maximum value of the horizontal distances between adjoining pairs of the coordinates before correction. However, the transformation ratio may be calculated based on the average or minimum value of the horizontal distances between adjoining pairs of the coordinates before correction.

Similarly, the vertical distances of the adjoining coordinates before correction are calculated to obtain the maximum value diff_y (step U107), and sets a vertical transformation ratio Δy at 1/diff_y (step U110).

When the coordinates in the vicinity of the upper right vertex of the image after correction IG1 shown in FIG. 6B is coordinates after correction (a_x, a_y), for example, the maximum value of the horizontal distance between the adjoining coordinates before correction is diff_x=2 as shown in FIG. 6A. Thus, the horizontal transformation ratio Δx becomes ½. On the other hand, the maximum value of the vertical distance between the adjoining coordinates before correction is diff_x=2.3. Thus, the vertical transformation ratio Δy becomes 1/(2.3).

When both the horizontal transformation ratio Δx and the vertical transformation ratio Δy are calculated, the transformation ratio calculation process for the coordinates after correction (a_x, a_y) ends. Then, the flow goes to the filter coefficient calculation process S103 (FIG. 5). The horizontal transformation ratio Δx and the vertical transformation ratio Δy in this embodiment correspond to transformation ratios in the appended claims.

A-4-1-1. Calculation Method of Coordinates Before Correction

The calculation method of coordinates before correction discussed above is now described. Since the image after correction IG1 is considered as an image produced from the image before correction IG0 by perspective transformation, the coordinates before correction are calculated from the coordinates after correction by inverse perspective transformation using the following equations (1) and (2). It is assumed that the coordinates before correction (x, y) are transformed into the coordinates after correction (X, Y) by perspective transformation.

$$x = \frac{AX + BY + C}{GX + HY + 1} \quad (1)$$

$$y = \frac{DX + EY + F}{GX + HY + 1} \quad (2)$$

Coefficients A, B, C, D, E, F, G, and H in the equations (1) and (2) are calculated by the matrix equation (equation 3) of perspective transformation shown below.

According to this embodiment, the image pickup unit 180 shots an image of the image PIG0 displayed on the screen SC prior to trapezoidal distortion correction before the image data after correction production process starts. Then, the CPU 160 (FIG. 3) obtains the four vertexes (X0 through X3, Y0 through Y3) (FIG. 2B) of the image after correction IG1 produced after trapezoidal distortion correction based on the shot image, and stores the coordinates after correction (X0 through X3, Y0 through Y3) in the register 147.

The coordinates after correction (X0 through X3, Y0 through Y3) may be obtained based on the detected angle as the inclination of the projector 100 to the vertical direction detected by the G sensor 190. Alternatively, the trapezoidal distortion correction may be manually performed by operation of the user through the remote controller 172. In this case, the CPU 160 calculates the coordinates after correction (X0 through X3, Y0 through Y3) in response to commands from the user received via the remote control unit 170.

The CPU 160 inputs the four coordinates (X0 through X3, Y0 through Y3) on the image after correction IG1 into the matrix equation (equation 3) as coordinates after correction (X0 through X3, Y0 through Y3) (see FIGS. 2A and 2B) obtained from the coordinates before correction (x0 through X3, Y0 through y3) by perspective transformation to calculate the coefficients A, B, C, D, E, F, G, and H and store these coefficients in the register 147.

$$\begin{pmatrix} X_0 & Y_0 & 1 & 0 & 0 & 1 & -x_0X_0 & -x_0Y_0 \\ 0 & 0 & 0 & X_0 & Y_0 & 0 & -y_0X_0 & -y_0Y_0 \\ X_1 & Y_1 & 1 & 0 & 0 & 1 & -x_1X_1 & -x_1Y_1 \\ 0 & 0 & 0 & X_1 & Y_1 & 0 & -y_1X_1 & -y_1Y_1 \\ X_2 & Y_2 & 1 & 0 & 0 & 1 & -x_2X_2 & -x_2Y_2 \\ 0 & 0 & 0 & X_2 & Y_2 & 0 & -y_2X_2 & -y_2Y_2 \\ X_3 & Y_3 & 1 & 0 & 0 & 1 & -x_3X_3 & -x_3Y_3 \\ 0 & 0 & 0 & X_3 & Y_3 & 0 & -y_3X_3 & -y_3Y_3 \end{pmatrix} \begin{pmatrix} A \\ B \\ C \\ D \\ E \\ F \\ G \\ H \end{pmatrix} = \begin{pmatrix} x_0 \\ y_0 \\ x_1 \\ y_1 \\ x_2 \\ y_2 \\ x_3 \\ y_3 \end{pmatrix} \quad (3)$$

When the coordinates after correction (X, Y)=(a_x, a_y) (FIG. 6B) are substituted in equations (1) and (2), the coordinates before correction (x, y)=src (1, 1) (FIG. 6A) are obtained.

A-4-2. Filter Coefficient Calculation Process

Figure 8:
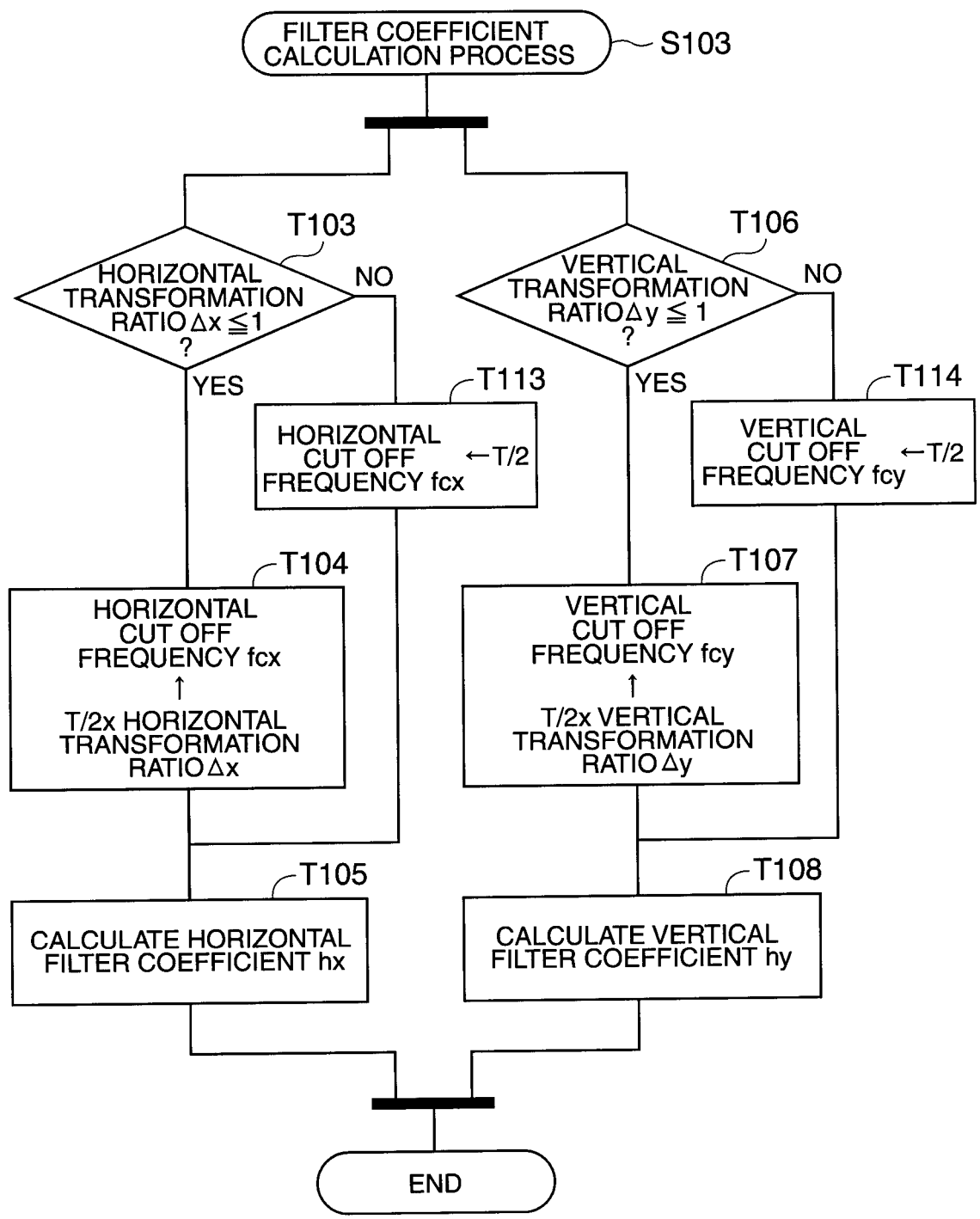
FIG. 8 is a flowchart showing flow of filter coefficient calculation process.

FIG. 8 is a flowchart showing flow of the filter coefficient calculation process. The filter coefficient calculation unit 146 calculates a horizontal filter coefficient hx and a vertical filter coefficient hy based on the horizontal transformation ratio Δx and the vertical transformation ratio Δy at the coordinates after correction (a_x−1, a_y−1) calculated in the transformation ratio calculation process S102. The horizontal filter coefficient hx and the vertical filter coefficient hy in this embodiment correspond to filter coefficients in the appended claims.

More specifically, the filter coefficient calculation unit 146 judges whether the horizontal transformation ratio Δx is 1 or smaller or not (step T103). When the filter coefficient calculation unit 146 judges that the horizontal transformation ratio Δx≤1 (YES in step T103), the filter coefficient calculation unit 146 sets a horizontal cut off frequency fc at T/2×(horizontal transformation ratio Δx) (step T104). In this case, T is sampling cycle expressed as 1 (cycle/pixel). Thus, a horizontal cut off frequency fcx becomes 0.5×(horizontal transformation ratio Δx).

When the coordinates in the vicinity of the upper right vertex of the image after correction IG1 shown in FIG. 6B are coordinates after correction (a_x−1, a_y−1), for example, the horizontal transformation ratio Δx becomes ½, as described above. Thus, the horizontal cut off frequency fcx becomes 0.5×½=0.25. Since the vertical transformation ratio Δy is 1/(2.3), the vertical cut off frequency fcy becomes 0.5× 1/(2.3)=0.22.

When the coordinate transformation unit 143 judges that the horizontal transformation ratio Δx is larger than 1 (that is, the maximum in the horizontal distances of the adjoining coordinates before correction is smaller than 1; in case of expansion by trapezoidal correction) (NO in step T103), the horizontal cut off frequency fcx becomes T/2=½=0.5 (step T113).

In trapezoidal correction, the size of the image after correction IG1 is generally reduced from that of the image before correction IG0 (transformation ratio: 1 or smaller) in many cases. The partially expanded parts (that is, transformation ratio: 1 or larger), if any, are scarcely expanded to two or three times larger size. According to sampling theorem, frequency component of a digital signal needs to be T/2 (T: sampling cycle) or smaller at the time of A/D conversion. When the frequency component does not satisfy this requirement, the digital signal does not return to the original signal after restoration to the analog signal. Thus, only T/2 or smaller frequency component is usually contained after conversion into the digital signal. When the transformation ratio is larger than 1, it is substantially meaningless, therefore, to keep frequency components larger than T/2 contained by setting the horizontal cut off frequency at T/2×(transformation ratio). Accordingly, when the transformation ratio is larger than 1, the horizontal cut off frequency fcx is set at T/2.

Similarly, the coordinate transformation unit 143 sets the vertical cut off frequency fcy at 0.5 (step T114) when judging that the vertical transformation ratio Δy is larger than 1 (NO in step T106).

Subsequently, the filter coefficient calculation unit 146 calculates the horizontal filter coefficient hx (step T105). More specifically, the filter coefficient calculation unit 146 calculates the coefficient hx by using the following equations (4) and (5).

$$h(n) = \frac{\omega_c}{\pi} \text{sinc}(n\omega_c) \quad (4)$$

$$\text{sinc}(x) = \frac{\sin x}{x} \quad (5)$$

h(n): filter coefficient

ωc: frequency ωc=2πfc (fc: cut off frequency)

n: degree of filter n=−N/2+1 thr. N/2 (N: number of surrounding pixels used for convolution calculation)

Since both the horizontal filter coefficient hx and the vertical filter coefficient hy of the filter coefficients are calculated by using the same equations, the equations (4) and (5) contain the filter coefficient h(n) and the cut off frequency fc to express both.

FIG. 9 illustrates a concept of the pixel interpolation method. In this embodiment, N represents the number of surrounding pixels used for convolution calculation. Thus, N is 4 as shown in FIG. 9, providing n=−1, 0, 1, and 2. For example, h(−1) is the filter coefficient at a symbol −1 (pixel on coordinates before correction) in FIG. 9.

Similarly, the filter coefficient calculation unit 146 calculates the vertical filter coefficient hy (steps T106 through T108). For example, when coordinates in the vicinity of the upper right vertex of the image after correction IG1 shown in FIG. 6B are coordinates after correction (a_x, a_y), the vertical transformation ratio Δy becomes 1/(2.3) as discussed above. Thus, the vertical cut off frequency fc becomes 0.5× 1/(2.3)=0.22.

After both the horizontal filter coefficient hx and the vertical filter coefficient hy are calculated (steps T105 and T108), the filter coefficient calculation unit 146 ends the filter coefficient calculation process and proceeds to step S119 (FIG. 5). By these processes, the filter coefficients used for obtaining the pixel value of the coordinates after correction (a_x, a_y) are calculated using pixel interpolation (convolution calculation) which will be described later.

A-4-3. Pixel Interpolation Method

As described above, the coordinates after correction (integer) do not always become integer when transformed into the coordinates before correction by inverse perspective transformation. When the coordinates before correction become decimal, no pixel value exists. Thus, a pixel value of the coordinates before correction which have become decimal is calculated by pixel interpolation (convolution calculation). By this method, the pixel value of the coordinates after correction is obtained. For calculating pixel value of interpolation pixel in this embodiment, horizontal interpolation is initially performed using 16 pixels around the target pixel, and then vertical interpolation is performed for calculating the pixel value of the target pixel. The surrounding 16 pixels used for pixel interpolation are extracted by the pixel block read unit 141 based on the integer value supplied from the integer/decimal separation unit 142, and supplied to the pixel interpolation unit 145. The pixel interpolation method in the horizontal direction (one-dimensional direction) is herein explained.

The pixel interpolation method is now described with reference to FIG. 9. FIG. 9 illustrates a concept of the pixel interpolation method. In this embodiment, transformation ratios in the horizontal direction and the vertical direction are separately calculated as explained above. More specifically, the horizontal filter coefficient hx is calculated based on the horizontal transformation ratio $\Delta x$, and the vertical filter coefficient hy is calculated based on the vertical transformation ratio $\Delta y$.

FIG. 9 shows a pixel whose pixel value is calculated (hereinafter referred to as "interpolation pixel" as well), and surrounding four pixels by indicating position (coordinates) on the horizontal axis and gradation on the vertical axis. In FIG. 9, the target pixel is represented by star mark, and the surrounding four pixels (referred to as symbols in the figure) are represented by round marks. Each number inside the round mark agrees with the value n of the filter coefficient h(n) discussed above. In the following explanation, the surrounding four pixels are referred to as "symbols" as well.

FIG. 9 also shows the filter coefficients h(n) corresponding to the surrounding four pixels (symbols) used for pixel interpolation. The filter coefficients are represented by square marks, and the numbers shown inside the quadrangles agree with the numbers of the surrounding four numbers shown in the above graph in FIG. 9. Thus, the filter coefficient for the symbol −1 shown in FIG. 9 corresponds to the filter coefficient h(−1) described above. The filter coefficients are calculated by the method shown in A-4-2. Filter Coefficient Calculation Process.

FIG. 9 further shows window functions corresponding to the surrounding four pixels (symbols) used for pixel interpolation. Window function is a function which becomes 0 in the range out of a certain finite section. By multiplying the convolution calculation by window function, Gibbs phenomenon can be prevented. Window functions are represented by triangular marks, and the numbers shown inside the triangles correspond to the numbers of the surrounding four pixels shown in FIG. 9.

The pixel value of the target pixel can be calculated by performing convolution calculation shown in the lower part in FIG. 9. More specifically, the pixel values of the respective symbols are multiplied by the filter coefficients h(n) and window functions at the respective symbol positions, and the total sum of the results is calculated as the pixel value of interpolation pixel, that is, the coordinates before correction (decimal) obtained from the target coordinates after correction by perspective transformation. By this method, the pixel value of the target coordinates after correction on the image after correction IG1 can be obtained.

A-5. Advantage of First Embodiment

As discussed above, the projector 100 according to this embodiment calculates the transformation ratio of the image after correction to the image before correction for each of the coordinates after correction, and the filter coefficient used for obtaining the pixel value of the coordinates after correction is calculated at the time of trapezoidal correction so as to obtain the pixel value of the coordinates after correction. Thus, the pixel value can be calculated using appropriate filter coefficient for each of the coordinates, which improves the quality of the image after correction.

The projector 100 according to this embodiment calculates the filter coefficient based on one parameter of transformation ratio for each of the coordinates. Thus, algorithms can be simplified compared with a structure which calculates filter coefficient based on the projection angle with respect to the projection surface of the projector and the coordinate position of the liquid crystal panel, for example.

According to this embodiment, the cut off frequency fc is calculated by T/2×(transformation ratio $\Delta$ (when transformation ratio≤1)). More specifically, in case of size reduction from the image before correction, filtering is applied by increasing intensity of anti-alias filter when reduction ratio is small. Thus, the area having large reduction ratio and lowered image quality is blurred to improve the image quality. On the other hand, the area expanded from the image before correction has the cut off frequency fc of T/2. Thus, blurring is not required more than necessary. As a result, image quality can be generally improved.

B. Second Embodiment

A projector according to a second embodiment has a structure similar to that of the projector 100 in the first embodiment except that the filter coefficient calculation method is different from that of the projector 100 of the first embodiment. Thus, only the filter coefficient calculation method is explained without repeating explanation of other parts.

According to this embodiment, the filter coefficient calculation unit 146 calculates the filter coefficient h based on a transformation ratio table T1 showing transformation ratios, an S table T2 showing interpolation distances, and an I table T3 showing symbol positions.

FIGS. 10A through 10C show respective tables used for calculation of the filter coefficients in this embodiment. FIGS. 10A, 10B, and 10C show the transformation ratio table T1, the S table T2, and the I table T3, respectively. The transformation ratio table T1, the S table T2, and the I table T3 are tables containing discrete transformation ratios of 1, 0.8, 0.6, 0.4, and 0.2, and interpolation distance divided into 8 discrete distances, and surrounding pixels of 4×4 (=16) pixels used for pixel interpolation, respectively.

Figure 11:
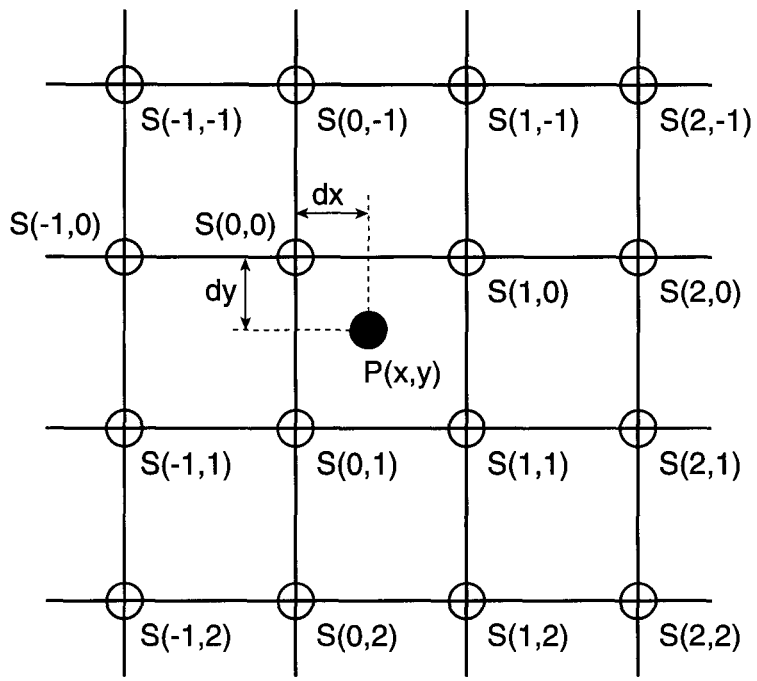
FIG. 11 shows positional relationship between interpolation pixel and surrounding 16 pixels used for pixel interpolation.

FIG. 11 shows positional relationship between the interpolation pixel and the surrounding 16 pixels used for pixel interpolation (represented as symbols in FIG. 9). The horizontal interpolation distance and the vertical interpolation distance are distances between the interpolation pixel and the symbol (pixel) positioned immediately above the interpolation pixel in the left direction. When the interpolation pixel is P (x, y) in FIG. 11, a horizontal interpolation distance dx and a vertical interpolation distance dy are distances between the interpolation pixel P and a symbol S (0, 0) as shown in FIG. 11. The symbol position indicates the coordinates of the symbol when the coordinates of the symbol (pixel) positioned immediately above the interpolation pixel in the left direction are (0, 0) (FIG. 11).

An S table 00 shown in FIG. 10B is an example of the S table T2. As shown in FIG. 10A, the S table T2 contains 5×5 (=25) tables from S table 00 to S table 44.

An I table 00 shown in FIG. 10C is an example of the I table T3. As shown in FIG. 10B, the I table T3 contains 8×8 (=64) tables. The filter coefficients in this embodiment are two-dimensional filter coefficients.

Figure 12:
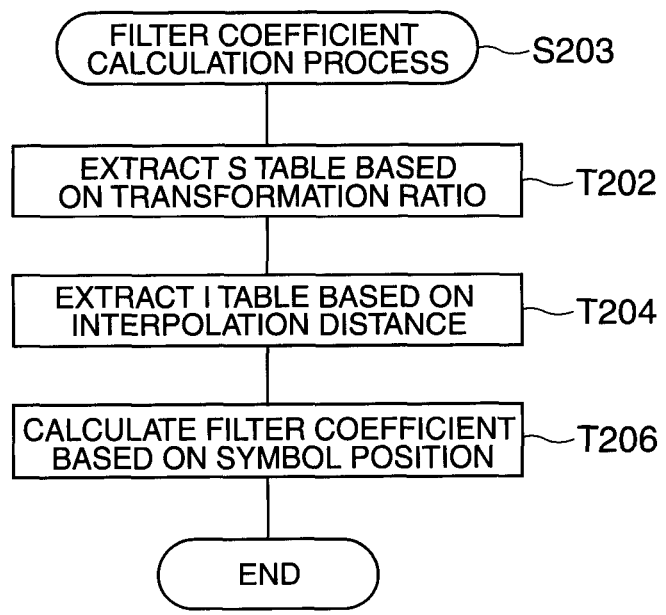
FIG. 12 is a flowchart showing flow of filter coefficient calculation process.

FIG. 12 is a flowchart showing flow of the filter coefficient calculation process in this embodiment. In this process, a filter coefficient calculation process S203 according to this embodiment is performed instead of the filter coefficient calculation process S103 (FIG. 5) in the first embodiment.

When the coordinate transformation unit 143 calculates the horizontal transformation ratio Δx and the vertical transformation ratio Δy (step S102 in FIG. 5), the filter coefficient calculation unit 146 initially extracts the S table T2 based on the calculated transformation ratios Δx and Δy (step T202). The filter coefficient calculation unit 146 sets the transformation ratio at 1 when (transformation ratio)≥1, sets the transformation ratio at 0.8 when 0.8≤(transformation ratio)<1, sets the transformation ratio at 0.6 when 0.6≤(transformation ratio)<0.8, sets the transformation ratio at 0.6 when 0.4≤(transformation ratio)<0.6, sets the transformation ratio at 0.4 when 0.2≤(transformation ratio)<0.4, and sets the transformation ratio at 0.2 when 0<(transformation ratio)<0.2 to refer to the transformation ratio table T1. For example, when both the horizontal transformation ratio Δx and the vertical transformation ratio Δy are 1, the coordinate transformation unit 143 refers to the S table 00.

The filter coefficient may be calculated by linear interpolation when the horizontal transformation ratio Δx and the vertical transformation ratio Δy are not discrete values contained in the transformation ratio table T1. In case of Δx=0.9, for example, the filter coefficient is calculated by linear interpolation using the filter coefficients when Δx=1 and Δx=0.8.

Then, the filter coefficient calculation unit 146 extracts the I table T3 based on the horizontal interpolation distance dx and the vertical interpolation distance dy (step T204). More specifically, the dismal part separated by the integer/dismal separation unit 142 becomes the horizontal interpolation distance dx and the vertical interpolation distance dy. For example, when the horizontal interpolation distance dx and the vertical interpolation distance dy are both 0, the filter coefficient calculation unit 146 refers to the I table 00.

The filter coefficient calculation unit 146 refers to the I table T3 to calculate the filter coefficients for the respective symbols (step T206), and ends the filter coefficient calculation process. The pixel interpolation unit 145 performs pixel interpolation by using the two-dimensional filter coefficients supplied from the filter coefficient calculation unit 146 (step S109 in FIG. 5).

According to this method, algorithms for calculating the filter coefficients are simplified. Thus, circuits for performing the interpolation process can be easily equipped, and the process speed of the trapezoidal correction can be increased.

C. Modified Examples

The invention is not limited to the embodiments described and depicted herein, but may be practiced otherwise without departing from the scope and spirit of the invention.

(1) According to the embodiments, the trapezoidal distortion correction unit 140 calculates transformation ratio for each of the coordinates after correction. However, the method of calculating transformation ratio is not limited to this method. For example, the image after transformation may be divided into blocks of the plural pixels (coordinates) to calculate transformation ratio for each block and use transformation ratio corresponding to each block for all pixels (coordinates) included in the corresponding block.

(2) According to the embodiments, eight coordinates around the target coordinates after correction are used to calculate transformation ratio when calculating transformation ratio on the coordinates after correction. However, the method of calculating transformation ratio is not limited to this method. For example, transformation ratio may be calculated using one coordinate next to the target coordinates after correction (one coordinate in both the x and y directions).

(3) According to the embodiments, the trapezoidal distortion correction unit 140 calculates 16 pixels around the interpolation pixel when performing pixel interpolation. However, the number of pixels used for pixel interpolation is not limited to this number.

(4) According to the first embodiment, the trapezoidal distortion correction unit 140 performs pixel interpolation by using so-called coefficient division type interpolation filter which employs the horizontal filter coefficient hx and the vertical filter coefficient hy. However, pixel interpolation may be performed using coefficient non-division type interpolation filter. Similarly, coefficient division type filter may be used in the second embodiment.

(5) While the projector is discussed in the embodiments, the image display device according to the invention may be a type which displays images on an image display unit such as liquid crystal panel and organic EL (electro-luminescence) panel as well as the projection type projector. When a rectangular image is displayed on an image display unit constituted by a cylindrical thin-film organic EL display panel, predetermined transformation process needs to be applied to the inputted image. In this case, the image quality is considered to be improved by calculating interpolation filter coefficients based on transformation ratios.

The image processing device may be a type included in a digital camera (image display device) having a liquid crystal panel (image display unit) for performing trapezoidal distortion correction. According to this image processing device, a sensor of the camera corrects distortion produced when the sensor position is not parallel with the subject (distortion of perspective) and outputs the result of correction to an image display unit such that an image shot with the sensor of the cameral disposed parallel with the subject can be displayed on the image display unit. In this case, the image quality can be similarly improved by calculating filter coefficients based on transformation ratios.

(6) According to the embodiments, the projector 100 modulates light emitted from the illumination system 152 using the transmission type liquid crystal panel 154. However, light from the illumination system 152 may be modulated using other devices such as digital micro-mirror device (DMD; trademark) and reflection type liquid crystal panel (liquid crystal on silicon (LCOS); trademark) instead of the transmission type liquid crystal panel 154.

(7) According to the embodiments, the trapezoidal distortion correction process is performed as transformation process for the original image. However, the transformation process is not limited to the trapezoidal distortion correction process. For example, when the user commands arbitrary transformation (such as transformation of rectangular image on display into trapezoidal shape for improvement of image effect) by operating the remote controller 172, the image may be transformed based on predetermined rule in response to the command. In this case, the image quality can be similarly improved by calculating filter coefficients based on transformation ratios.

(8) According to the embodiments, the trapezoidal distortion correction unit 140 as the image processing device outputs image data after correction to the liquid crystal panel drive unit 155 and displays the image data after correction on the liquid crystal panel 154. However, the trapezoidal distortion correction unit 140 may output the image data after correction to various types of output devices such as printer and hard disk to which the data is written. In this case, the image quality can be similarly improved when the inputted image is transformed and outputted.

(9) The method of calculating filter coefficients is not limited to the method shown in the embodiments. For example, the horizontal cut off frequency fcx is T/2×(horizontal transformation ratio Δx) when the horizontal transformation ratio Δx is 1 or smaller according to the embodiments, but the coefficient to be multiplied by the horizontal transformation ratio Δx may be the optimum coefficient calculated by experiment other than T/2.

(10) A part of the function provided by software in the embodiments may be provided by hardware, and a part of the function provided by hardware may be provided by software.

What is claimed is:

1. An image processing device, comprising:
   a transformation ratio calculation unit which calculates a transformation ratio of an image after transformation, the image after transformation being obtained by transforming an original image based on a predetermined rule, coordinates of pixels in the original image being obtained by coordinate transformation of coordinates of pixels in the image after transformation, the transformation ratio being calculated based on a distance between adjoining ones of the coordinates of pixels in the original image;
   a filter coefficient calculation unit which calculates filter coefficients based on the transformation ratio; and
   a pixel value calculation unit which calculates a pixel value of each pixel in the image after transformation based on the filter coefficients and outputs the pixel value of the pixel in the image after transformation as image data after transformation,
   wherein the filter coefficient calculation unit calculates the filter coefficients for each pixel of the image after transformation based on the transformation ratio for each pixel of the image after transformation.

2. The image processing device according to claim 1, wherein the transformation ratio calculation unit calculates the transformation ratio for each pixel of the image after transformation.

3. The image processing device according to claim 1, wherein the image after transformation represents an image produced by applying a trapezoidal distortion correction to the original image.

4. The image processing device according to claim 1, wherein the pixel value calculation unit uses pixel interpolation to calculate the pixel value of each pixel in the image after transformation based on a pixel value of pixels in the original image and the filter coefficients for the pixel in the image after transformation.

5. An image display device, comprising:
   an image processing device; and
   an image display unit which displays an image based on image data after transformation sent from the image processing device,
   wherein the image processing device includes
      a transformation ratio calculation unit which calculates a transformation ratio of an image after transformation obtained by transforming an original image based on a predetermined rule to the original image for each pixel, coordinates of pixels in the original image being obtained by coordinate transformation of coordinates of pixels in the image after transformation, the transformation ratio being calculated based on a distance between adjoining ones of the coordinates of pixels in the original image,
      a filter coefficient calculation unit which calculates filter coefficients based on the transformation ratio corresponding to each pixel to use the filter coefficients for calculation of a pixel value of the image after transformation by pixel interpolation using a pixel value of the original image, and
      a pixel value calculation unit which calculates a pixel value of each pixel in the image after transformation based on the filter coefficients corresponding to each pixel and outputs the pixel value of the pixel in the image after transformation as image data after transformation.

6. The image display device according to claim 5, wherein the display unit comprises:
   a light source;
   a modulation unit which modulates light from the light source; and
   a projection system which projects the image produced by using light modulated by the modulation unit on a projection surface.

7. The image display device according to claim 5, wherein the image processing device sends image data representing an image produced by applying trapezoidal distortion correction to the original image to the image display unit as the image data after transformation.

8. An image data producing method for producing an image data after transformation representing an image after transformation formed by transforming an original image represented by an original image data under a predetermined rule, the method comprising:
   calculating a transformation ratio of the image after transformation to the original image for each pixel of the image after transformation, coordinates of pixels in the original image being obtained by coordinate transformation of coordinates of pixels in the image after transformation, the transformation ratio being calculated based on a distance between adjoining ones of the coordinates of pixels in the original image;
   calculating filter coefficients based on the transformation ratio for each pixel of the image after transformation to use the filter coefficients for calculation of a pixel value of the image after transformation by pixel interpolation using a pixel value of the original image;
   calculating a pixel value for each pixel of the image after transformation using the filter coefficients corresponding to each pixel of the image after transformation; and
   sending the calculated pixel values of the image after transformation to an image display unit as image data after transformation.

9. An image data producing method for producing an image data after transformation representing an image after transformation formed by transforming an original image represented by an original image data under a predetermined rule, the method comprising:
   calculating a transformation ratio for each pixel of the image after transformation, coordinates of pixels in the original image being obtained by coordinate transformation of coordinates of pixels in the image after transformation the transformation ratio being calculated based on a distance between adjoining ones of the coordinates of pixels in the original image;
   calculating filter coefficients based on the transformation ratio for each pixel of the image after transformation;
   calculating a pixel value for each pixel of the image after transformation using the filter coefficients corresponding to each pixel of the image after transformation; and sending the calculated pixel values of the image after transformation to an image display unit as image data after transformation.

* * * * *